United States Patent
Friedrich et al.

(10) Patent No.: US 11,846,321 B2
(45) Date of Patent: Dec. 19, 2023

(54) METHOD OF FORMING A BEARING CAGE SEGMENT INCLUDING A JOINT EDGE FOR WELDING

(71) Applicant: AKTIEBOLAGET SKF, Gothenburg (SE)

(72) Inventors: Hans-Juergen Friedrich, Königsberg-Römershofen (DE); Norbert Huhn, Schweinfurt (DE); Thomas Kettner, Bamberg (DE); Manfred Mattes, Kolbingen (DE); Harald Metz, Randersacker (DE); Achim Mueller, Dittelbrunn (DE); Alfred Radina, Poppenlauer (DE); Jonas Schierling, Hassfurt (DE); Maximilian Soellner, Bundorf (DE); Markus Volkmuth, Werneck-Zeuzleben (DE)

(73) Assignee: AKTIEBOLAGET SKF, Gothenburg (SE)

(*) Notice: Subject to any disclaimer, the term of this patent is extended or adjusted under 35 U.S.C. 154(b) by 85 days.

(21) Appl. No.: 17/400,177

(22) Filed: Aug. 12, 2021

(65) Prior Publication Data
US 2021/0372475 A1 Dec. 2, 2021

Related U.S. Application Data

(63) Continuation of application No. 16/778,111, filed on Jan. 31, 2020, now abandoned.

(30) Foreign Application Priority Data

Feb. 7, 2019 (DE) .......................... 102019201560.3

(51) Int. Cl.
*F16C 33/54* (2006.01)
*F16C 33/46* (2006.01)
(Continued)

(52) U.S. Cl.
CPC ............ *F16C 33/543* (2013.01); *B23K 26/26* (2013.01); *B23K 26/38* (2013.01); *B23P 15/003* (2013.01);
(Continued)

(58) Field of Classification Search
CPC .... F16C 33/543; F16C 33/467; F16C 33/545; B23K 26/38; B23K 26/26; B23P 15/003; Y10T 29/49691
See application file for complete search history.

(56) References Cited

U.S. PATENT DOCUMENTS 2,269,224 A 1/1942 Reilly
2,417,559 A 3/1947 Larson
(Continued)

FOREIGN PATENT DOCUMENTS

CN 103415717 A 11/2013
CN 104475350 A 4/2015
(Continued)

OTHER PUBLICATIONS

European Search Report from the European Patent Office dispatched Feb. 11, 2022, in related application No. EP 22178213.9, including European Search Opinion.
(Continued)

*Primary Examiner* — Jason L Vaughan
(74) *Attorney, Agent, or Firm* — J-TEK LAW PLLC; Scott T. Wakeman; Mark A. Ussai

(57) ABSTRACT

A method of forming a bearing cage segment includes determining a path of a periphery of the bearing cage segment along a metal sheet, punching a plurality of openings in the metal sheet inside the path to form a plurality of pockets separated by a plurality of bridges and separating the bearing cage segment from the metal sheet at the path. The separating includes laser cutting first and second joint
(Continued)

edges at a first end of the row and third and fourth joint edges at a second end of the row, where the first joint edge is spaced from the second joint edge in a length direction of the bridges and the third joint edge is spaced from the fourth joint edge in the length direction of the bridges.

16 Claims, 2 Drawing Sheets

(51) Int. Cl.
    *B23K 26/26* (2014.01)
    *B23K 26/38* (2014.01)
    *B23P 15/00* (2006.01)

(52) U.S. Cl.
    CPC .......... *F16C 33/467* (2013.01); *F16C 33/545* (2013.01); *Y10T 29/49691* (2015.01)

(56) References Cited

U.S. PATENT DOCUMENTS

| | | | |
|---|---|---|---|
| 2,591,160 A | | 4/1952 | Kilian |
| 2,721,776 A | | 10/1955 | Ture |
| 2,946,633 A | | 7/1960 | Andreas |
| 3,202,467 A | * | 8/1965 | Eckstein ............... B21D 53/12 29/898.067 |
| 3,313,582 A | | 4/1967 | Henry |
| 3,353,246 A | | 11/1967 | Farmer |
| 3,356,428 A | | 12/1967 | Ralph |
| 3,365,775 A | * | 1/1968 | Cavagnero ............ F16C 33/545 228/173.6 |
| 3,473,857 A | | 10/1969 | Pitner |
| 3,526,026 A | * | 9/1970 | Warchol ............... F16C 33/545 493/287 |
| 3,605,247 A | | 9/1971 | Bingle et al. |
| 3,626,565 A | * | 12/1971 | Koch ................. F16C 33/4629 29/898.067 |
| 3,820,867 A | | 6/1974 | Dickinson et al. |
| 3,902,772 A | | 9/1975 | Spate |
| 3,992,764 A | | 11/1976 | Serasio |
| 4,397,507 A | | 8/1983 | Kraus et al. |
| 4,577,088 A | | 3/1986 | Sharp |
| 4,821,386 A | | 4/1989 | Simon et al. |
| 4,942,652 A | | 7/1990 | Hazebrook et al. |
| 5,187,345 A | | 2/1993 | Alling et al. |
| 5,199,170 A | | 4/1993 | Mori et al. |
| 5,255,985 A | | 10/1993 | Alling |
| 5,528,706 A | | 6/1996 | Harimoto et al. |
| 5,795,080 A | | 8/1998 | Fujiwara et al. |
| 6,330,748 B1 | | 12/2001 | Müntnich et al. |
| 6,752,535 B2 | | 6/2004 | Krochak |
| 6,883,968 B2 | | 4/2005 | Fugel et al. |
| 6,955,476 B1 | * | 10/2005 | Murai ................... F16C 33/416 384/572 |
| 7,571,706 B2 | | 8/2009 | Ichikawa et al. |
| 8,696,210 B2 | | 4/2014 | Kawai et al. |
| 8,770,854 B2 | | 7/2014 | Friedrich et al. |
| 9,239,077 B2 | | 1/2016 | Doki-Thonon et al. |
| 9,382,947 B2 | | 7/2016 | Ishibashi |
| 9,429,194 B2 | | 8/2016 | Reimchen |
| 9,512,881 B2 | | 12/2016 | Katayama et al. |
| 9,551,377 B2 | | 1/2017 | Haas et al. |
| 11,149,793 B2 | | 10/2021 | Friedrich et al. |
| 2007/0248298 A1 | | 10/2007 | Chihara |
| 2008/0245631 A1 | | 10/2008 | Bochen et al. |
| 2012/0063713 A1 | | 3/2012 | Beuerlein |
| 2012/0170883 A1 | | 7/2012 | Evans et al. |
| 2013/0034321 A1 | | 2/2013 | Beck et al. |
| 2013/0308890 A1 | | 11/2013 | Steblau |
| 2015/0159696 A1 | | 6/2015 | Manne et al. |
| 2016/0017919 A1 | | 1/2016 | Haas et al. |
| 2019/0226528 A1 | | 7/2019 | Hainz et al. |
| 2020/0256389 A1 | | 8/2020 | Friedrich et al. |
| 2021/0310519 A1 | | 10/2021 | Friedrich et al. |
| 2021/0372475 A1 | | 12/2021 | Friedrich et al. |
| 2022/0403883 A1 | | 12/2022 | Beyfuss et al. |
| 2022/0403885 A1 | | 12/2022 | Beyfuss et al. |
| 2022/0403886 A1 | | 12/2022 | Beyfuss et al. |
| 2023/0220877 A1 | | 7/2023 | Beyfuss et al. |
| 2023/0220879 A1 | | 7/2023 | Beyfuss et al. |

FOREIGN PATENT DOCUMENTS

| | | |
|---|---|---|
| CN | 104847794 A | 8/2015 |
| CN | 104847795 A | 8/2015 |
| CN | 105605100 A | 5/2016 |
| CN | 106271725 A | 1/2017 |
| CN | 206215979 U | 6/2017 |
| CN | 107120357 A | 9/2017 |
| DE | 2111081 A1 | 9/1972 |
| DE | 3130610 A1 | 2/1983 |
| DE | 19910928 A1 | 9/2000 |
| DE | 10065169 A1 | 7/2002 |
| DE | 102006045436 A1 | 3/2008 |
| DE | 102008034922 A1 | 2/2010 |
| DE | 102009017751 A1 | 10/2010 |
| DE | 102009034018 A1 | 12/2010 |
| DE | 102009004657 | 2/2011 |
| DE | 102012221097 A1 | 5/2014 |
| DE | 102013218286 A1 | 3/2015 |
| DE | 102015210924 A1 | 7/2016 |
| DE | 102015206533 A1 | 10/2016 |
| DE | 102016201052 A1 | 7/2017 |
| DE | 102016216286 A1 | 3/2018 |
| DE | 102016222336 A1 | 5/2018 |
| DE | 102017117010 A1 | 7/2018 |
| DE | 102017127529 A1 | 5/2019 |
| DE | 102019115335 A1 | 12/2020 |
| EP | 0074803 A1 | 3/1983 |
| EP | 2213894 A1 | 8/2010 |
| EP | 2677184 A1 | 12/2013 |
| EP | 2839175 B1 | 5/2016 |
| EP | 4105506 A1 | 12/2022 |
| FR | 2234483 A1 | 1/1975 |
| FR | 2514440 A1 | 4/1983 |
| FR | 2612102 A1 | 9/1988 |
| FR | 3013087 A1 | 5/2015 |
| GB | 1431612 A | 4/1976 |
| GB | 2103307 A | 2/1983 |
| JP | H0742744 A | 2/1995 |
| JP | H0742744 U | 8/1995 |
| JP | 07317773 A | 12/1995 |
| JP | H07317773 A | 12/1995 |
| JP | H08270658 A | 10/1996 |
| JP | 2005076697 A | 3/2005 |
| JP | 2006064044 A | 3/2006 |
| JP | 2007247856 A | 9/2007 |
| JP | 2008215390 A | 9/2008 |
| JP | 2008215615 A | 9/2008 |
| JP | 2009243556 A | 10/2009 |
| JP | 4786124 B2 | 10/2011 |
| JP | 2013007435 A | 1/2013 |
| JP | 2013061076 A | 4/2013 |
| JP | 2013108587 A | 6/2013 |
| JP | 2017026083 A | 2/2017 |
| JP | 6197844 B2 | 9/2017 |
| NL | 6910823 A | 3/1970 |
| WO | 2008040290 A1 | 4/2008 |
| WO | 2014136816 A1 | 9/2014 |
| WO | 2015022355 A1 | 2/2015 |
| WO | 2018109784 A1 | 6/2018 |

OTHER PUBLICATIONS

Office Action from the United States Patent Office dated Mar. 30, 2023 in related U.S. Appl. No. 17/350,081.

LaserJob, Inc., Laser Material Processing, Oct. 2012, p. 2 (Year: 2012).

(56) References Cited

OTHER PUBLICATIONS

Unpublished U.S. Appl. No. 18/091,491, Berthold Beyfuss, filed Dec. 30, 2022.

* cited by examiner

METHOD OF FORMING A BEARING CAGE SEGMENT INCLUDING A JOINT EDGE FOR WELDING

CROSS-REFERENCE

This application is a continuation of pending U.S. patent application Ser. No. 16/778,111, filed Jan. 31, 2020, which claims priority to German patent application no. 10 2019 201 560.3 filed on Feb. 7, 2019, the contents of both of which are fully incorporated herein by reference.

TECHNOLOGICAL FIELD

The present disclosure is directed to method of forming a bearing cage segment of a sheet metal cage having an improved joint edge for welding and to a sheet metal cage including such a bearing cage segment.

BACKGROUND

Bearing cages are known from the prior art that are composed of one or more rounded cage segments, made of sheet metal, that are respectively connected to one another at their joint edges, for example by welding.

Here it is known to produce the structure and contour of such bearing cage segments by punching and stamping. For this purpose in a first step a metal band is intermittently moved in the longitudinal direction, wherein transversely extending slots are formed by a punch press. In a further step the metal band is cut to length using a transverse cutting device so that a ladder-shaped sheet metal part is formed, wherein the "rungs" of this part form bridges of the bearing cage segment, the slots of the part form pockets of the bearing cage segment, and the "side rails" of the part form the ring sections of the bearing cage segment. In a subsequent step the ring sections are then bent to a desired radius of curvature by round molds.

The cutting-to-length is usually effected here in the region of a pocket so that a joint edge is formed on each of the ring sections and a "partial pocket" is formed therebetween. When assembling the bearing cage segment into a finished cage, these joint edges—after a post-processing, which is to be discussed in more detail below—are welded together with two further, analogously formed joint edges, so that a "welding pocket" is formed by the connecting of the "partial pockets."

Cutting-to-length is a punching process in which a combined shear-cutting and breaking occurs. For this reason the joint edges of the ring sections, which joint edges are formed by the cutting-to-length of the sheet metal and are directed in the circumferential direction, are not dimensionally stable enough to be able to serve directly as a welding surface. The post-processing mentioned here is therefore required. In addition, a cutting liquid is typically used during the cutting-to-length which must still be removed for a further processing.

The post-processing here is necessarily associated with a material removal. If, therefore, after the bearing cage segment has been bent round the post-processed joint edges were to simply be welded to the corresponding joint edges opposing in the circumferential direction, then at this connecting point a welding pocket would be formed which, viewed in the circumferential direction, would have a smaller width than the other pockets. For this reason, according to the prior art, after cutting to size the ring sections are first shortened by approximately a complete pocket width and only then post-processed, so that with respect to the desired pocket width they have the correct length for connecting to the opposing joint edges. The final bridge is lost in this way as waste. Accordingly, in addition to the additional effort of the post-processing, significant material loss also occurs here.

The quality of the welded joint is of particular significance here since the performance of the finished bearing cage significantly depends thereon.

SUMMARY

It is therefore an aspect of the present disclosure to provide a bearing cage segment that can be manufactured with high reliability at lower expense.

In the following a bearing cage segment of a sheet metal cage, in particular for a needle roller bearing, is provided, which includes a first ring section, at least one second ring section, and a plurality of bridges connecting the first ring section and the at least one second ring section to each other, wherein a pocket for receiving at least one rolling element is respectively formed between the bridges. Here the disclosure is based on the idea that the bearing cage segment includes, on at least one ring section, a joint edge directed in the circumferential direction, which joint edge is configured to be connected to another joint edge, wherein the joint edge is disposed in the region of a pocket to be formed by this connection, and wherein the joint edge is formed by laser cutting.

Here the bearing cage segment can be configured for single-row or multi-row bearing cages.

The joint edge can be formed so precisely by the laser cutting that it is directly suitable as a welding edge. In this way a post-processing of the welding edge is not required for a reliable welding connection. In addition, the bearing cage segment can be individually manufactured by laser cutting, for example, by a cutting-out from a metal sheet, so that the joint edge need not be formed by cutting to length. In this way the material loss, as occurs in the above-mentioned prior art, can also be avoided. The manufacturing is thus made easier.

According to one exemplary embodiment, the joint edge includes a chamfer on the radially outer side and/or the radially inner side. This design makes it possible that during the production of the welding connection no region forms that projects radially or axially over the respective ring section, in particular no projecting weld seam (so-called upper bead).

A particularly simple manufacture of the chamfer is made possible when it is formed by a reshaping process, i.e., for example, by a rolling or a milling.

According to one exemplary embodiment the entire to-be-formed pocket is laser-cut, wherein the other pockets are preferably punched. Due to the laser cutting of the to-be-formed pocket, the joint edge can be correspondingly advantageously configured. However, the producing of the "normal" or "whole" pockets can advantageously be effected by a simple and rapid punching.

According to one exemplary embodiment, the joint edge is disposed approximately centrally with respect to the to-be-formed pocket. In this way—with respect to a plane of the welding connection—a particularly symmetrical design arises, whereby it can be achieved that undesirable non-uniform forces that act on the connection during operation of the finished bearing cage can be avoided, or are at least particularly low.

According to one exemplary embodiment, the ring sections include a joint edge in the region of the to-be-formed pocket. The above-mentioned advantages thus arise in all ring sections.

According to a further aspect of the disclosure a sheet metal cage is provided, in particular for a needle roller bearing, that includes at least one of the above-described bearing cage segments. Here the at least one bearing cage segment or the plurality of bearing cage segments are connected at their joint edges via a material-bonded connection, in particular welded. The sheet metal cage can thus be manufactured particularly advantageously overall. Electrical resistance welding or laser welding are particularly suitable here as welding. It can thus be achieved that the weld seam is particularly small. The sheet metal cage can be configured single-row or multi-row.

Another aspect of the disclosure is a method of forming a bearing cage segment which method includes determining a path of a periphery of the bearing cage segment along a metal sheet, punching a plurality of openings in the metal sheet inside the path to form a plurality of pockets separated by a plurality of bridges, the plurality of pockets being disposed in a row extending in a first direction, the bridges having a length direction transverse to the first direction and having a width in the first direction, and having a thickness in a direction perpendicular the first direction and to the width, and separating the bearing cage segment from the metal sheet at the path. The separating comprises laser cutting a first joint edge and a second joint edge at a first end of the row and a third joint edge and a fourth joint edge at a second end of the row, the first joint edge being spaced from the second joint edge in the length direction of the bridges and the third joint edge being spaced from the fourth joint edge in the length direction of the bridges. The path may include a first linear section connecting the first joint edge to the third joint edge and a second linear section connecting the second joint edge to the fourth joint edge, where the first linear section is parallel to the second linear section.

A further aspect of the disclosure is a method of forming a bearing cage segment which method includes punching a plurality of openings in a body of sheet metal, the plurality of openings being arranged in a row, laser cutting a first joint edge and a second joint edge spaced from the first joint edge at a first end of the row, and laser cutting a third joint edge and a fourth joint edge spaced from the third joint edge at a second end of the row to separate bearing cage from the body of sheet metal.

Further advantages and advantageous embodiments are provided in the description, the drawings, and the claims. Here in particular the combinations of features specified in the description and in the drawings are purely exemplary, so that the features can also be present individually or combined in other ways.

In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers. The direction designations used in the following—axial, radial, circumferential—always refer to the finished bearing cage.

Figure 1:
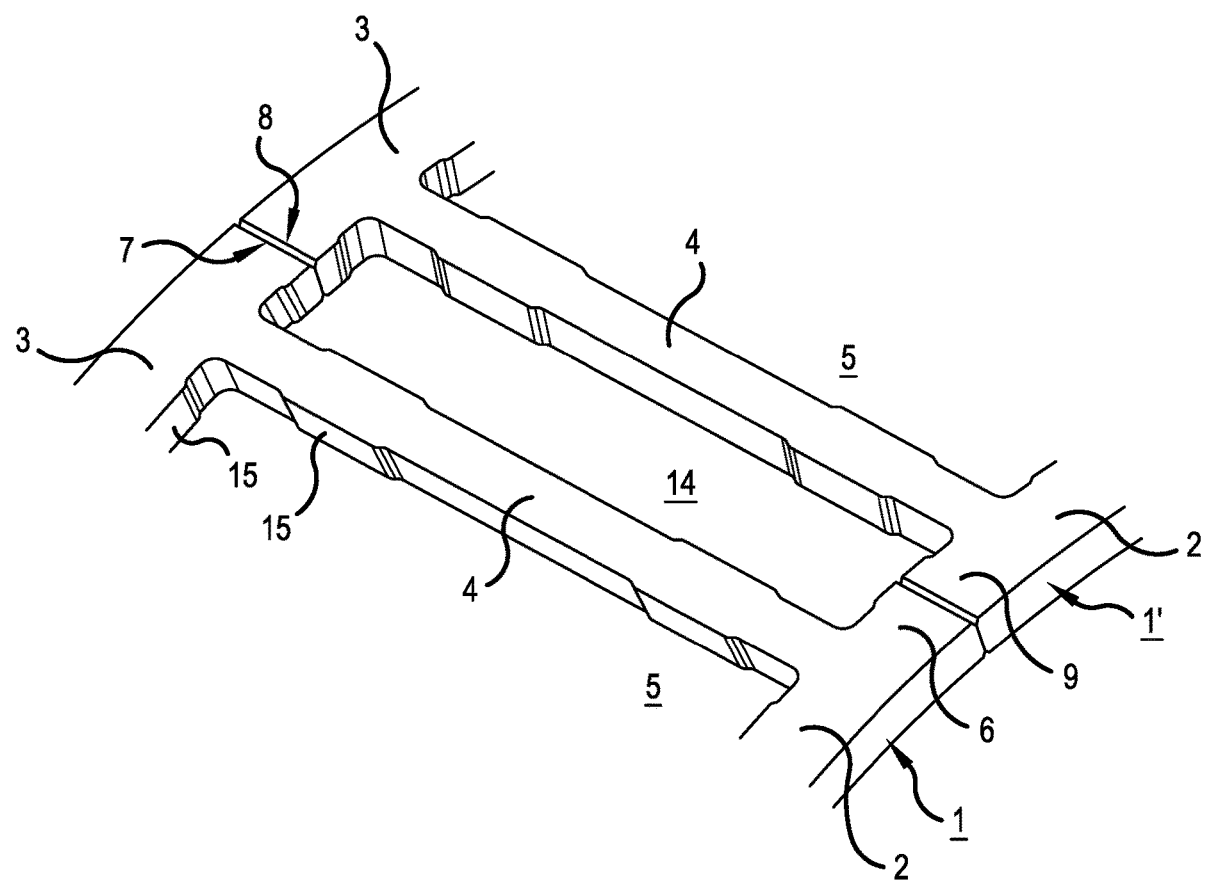
FIG. 1 is a perspective representation of a connecting region of a bearing cage segment according to an embodiment of the disclosure.

FIG. 1 shows an exemplary embodiment of at least one inventive bearing cage segment 1 of a sheet metal cage in the joint region between a first bearing cage segment end 6 and a second bearing cage segment end 9. Here the sheet metal cage can be formed from a single bearing cage segment 1, so that the bearing cage-segment ends 6, 9, also referred to here in the following simply as "ends" 6, 9, are two circumferential ends of only one bearing cage segment 1. Alternatively the sheet metal cage can include a plurality of bearing cage segments, wherein the first end 6 is one end of a first bearing cage segment 1, and the second end 9 is one end of a second bearing cage segment 1.

For the sake of simplicity it is assumed in the following that two bearing cage segments 1, 1' abut against each other by their ends 6, 9. The case that the first end 6 and the second end 9 are formed by the same bearing cage segment 1 obviously arises in an analogous manner.

Each bearing cage segment 1, 1' includes a first ring section 2 and a second ring section 3, and a plurality of bridges 4 connecting the first ring section 2 and the second ring section 3 to each other. In FIG. 1 only the final bridge 4 of the first end 6 and the final bridge 4 of the second end 9 are shown. Instead of the single-row design of the bearing cage segment 1 depicted here, the bearing cage segment 1 can also be configured multi-row, and would then include a first, a second, and further ring sections that are each connected to each other by bridges.

A pocket 5 for receiving at least one rolling element is respectively formed between the bridges 4. In the example shown the sheet metal cage is a needle-roller-bearing cage, and the pockets 5 are each configured for receiving a needle-shaped rolling element.

On its first end 6 on the first ring section 2 the bearing cage segment 1 includes a joint edge 7 directed in the circumferential direction, which joint edge 7 is configured to be connected to another joint edge 8 of the second bearing cage segment 1', which joint edge 8 is formed here in an analogous manner on the second end 9 on the first ring section 2.

The joint edges 7, 8 are preferably connected to each other via a connection, in particular a material-bonded connection, here a weld connection. Here a laser welding or an electrical resistance welding is particularly suitable for producing the connection.

As can be seen from the perspective representation of FIG. 1, the joint edge 7 is disposed in the region of a pocket 14 to be formed by the connection, here also referred to as "welding pocket" 14. Accordingly a first "partial pocket" is formed by the first end 6, and a corresponding second partial pocket by the second end 9, wherein due to the connection of the joint edges 7, 8 these partial pockets form the to-be-formed pocket 14 or are assembled into the to-be-formed pocket 14.

Here, viewed in the circumferential direction, the joint edges 7, 8 are disposed approximately centrally with respect to the welding pocket 14. In particular the design can be such that the joint edges 7, 8 lie in a plane that represents a plane of symmetry for the to-be-formed pocket 14. However, the joint edges 7, 8 can of course also be disposed non-centrally and/or offset from each other.

The joint edges 7, 8 are formed by laser cutting. The entire partial pocket of the first end 6 of the first bearing cage segment 1, or of the second end 9 of the second bearing cage segment 1', is preferably formed by laser cutting. In this way the joint edges 7, 8 can be shaped so precisely that a post-processing for suitability as a welding surface is no longer required. Here the surface is directly cleaned by the laser cutting process.

On the second ring section 3 the design in the region of the connection is preferably analogous to the design on the first ring section 1.

The pockets 5 (without the "welding pocket" 14) can all be formed by punching.

As can be seen from FIG. 1, guide surfaces 15 of the pockets 5 for guiding the rolling elements can be formed on the bridges 4 and on the ring sections 2, 3. These guide surfaces 15 can be formed, for example, by the punching of the pockets 5. The welding pocket 14 can also include corresponding guide surfaces 15 that can preferably be directly formed here by the above-mentioned laser cutting of the respective partial pockets.

Figure 2:
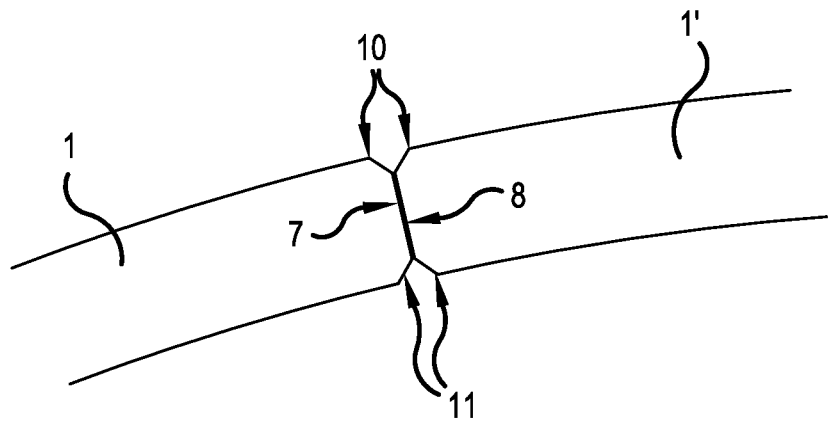
FIG. 2 is a cross-sectional representation of two mutually contacting joint-edge regions of a bearing cage segment before being welded.

FIG. 2 shows a cross-sectional representation through the first ring section 2 in the region of the connection of the joint edges 7, 8, wherein a state is shown wherein the joint edges 7, 8 contact each other but are not yet welded.

Figure 3:
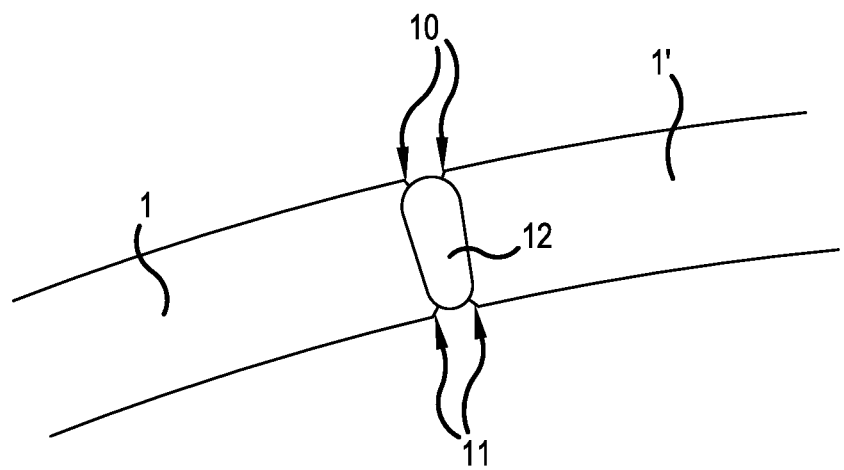
FIG. 3 is the bearing cage region of FIG. 2 after being welded.

As can be seen from FIG. 2, the joint edges 7, 8 also include a first chamfer 10 on the radially outer side, and a second chamfer 11 on the radially inner side. The chamfers 10, 11 serve to receive a radial or axial material accumulation, for example, an upper bead, as could arise due to the welding process. In FIG. 3 the state is shown after the welding. The weld seam 12 formed by the welding can be seen here. Due to the chamfers 10, 11 no projections are formed.

The chamfers 10, 11 are preferably produced by a reshaping process, for example, a rolling or milling. The laser cutting and the reshaping preferably occur with the aid of one and the same machine so that in particular the bearing cage segment 1 need not be transported to a further tool to form the chamfers 10, 11.

In summary a bearing cage segment is provided that includes a laser-cut joint edge that is directly suitable for a weld connection. Here the joint edge includes a chamfer, whereby the formation of a projection is avoided in the course of the welding.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cage segments.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST 1, 1' Bearing cage segment
2 First ring section
3 Second ring section
4 Bridge
5 Pockets
6 First end
7, 8 Joint edges
9 Second end
10 First chamfer
11 Second chamfer
12 Weld seam
14 Welding pocket
15 Guide surfaces

What is claimed is:

1. A method of forming a bearing cage segment comprising:
   determining a path of a periphery of the bearing cage segment along a metal sheet;
   punching a plurality of openings in the metal sheet inside the path to form a plurality of pockets separated by a plurality of bridges, the plurality of pockets being disposed in a row extending in a first direction, the bridges having a length direction transverse to the first direction and having a width in the first direction, and having a thickness in a direction perpendicular the first direction and to the width, and
   separating the bearing cage segment from the metal sheet at the path,
   wherein the separating comprises laser cutting a first joint edge and a second joint edge at a first end of the row and a third joint edge and a fourth joint edge at a second end of the row, the first joint edge being spaced from the second joint edge in the length direction of the bridges and the third joint edge being spaced from the fourth joint edge in the length direction of the bridges, and laser cutting a first partial pocket between the first joint edge and the second joint edge and laser cutting a second partial pocket between the third joint edge and the fourth joint edge.

2. The method according to claim 1,
   including forming a chamfer on a radially outer side of the first and second joint edges.

3. The method according to claim 2, wherein the forming comprises a rolling or milling.

4. The method according to claim 2,
   wherein the forming comprises a rolling or milling.

5. The method according to claim 1,
   including forming a chamfer on a radially outer side and a radially inner side of the first and second joint edges.

6. A method of forming at least one sheet metal bearing cage comprising:
provubuidun at least one bearing cage segment according to claim 1,
connecting the first joint edge to the third joint edge, and
connecting the second joint edge to the fourth joint edge.

7. A method of forming at least one sheet metal bearing cage comprising:
providing at least one bearing cage segment according to claim 1,
welding the first joint edge to the third joint edge, and
welding the second joint edge to the fourth joint edge.

8. The method according to claim 7,
wherein the welding comprises laser welding the first joint.

9. The method according to claim 7,
wherein the welding comprises resistance welding the first joint.

10. The method according to claim 1,
wherein the laser cutting a first partial pocket comprises laser cutting a first side of the first partial pocket extending from the first joint edge toward the plurality of bridges, laser cutting a second side of the first partial pocket from an end of the second joint edge toward the plurality of bridges and laser cutting a third side of the first partial pocket connecting the first side of the first partial pocket to the second side of the first partial pocket.

11. A method of forming a bearing cage segment comprising:
punching a plurality of openings in a body of sheet metal, the plurality of openings being arranged in a row, and
laser cutting a path around the plurality of openings to form the bearing cage segment,
wherein the path includes a first joint edge and a second joint edge spaced from the first joint edge at a first end of the row and a third joint edge and a fourth joint edge at a second end of the row and a first longitudinal edge connecting the first joint edge to the third joint edge and a second longitudinal edge connecting the second joint edge to the fourth joint edge, and
wherein the path defines a first partial pocket between the first joint edge and the second joint edge and a second partial pocket between the third joint edge and the fourth joint edge.

12. The method according to claim 11,
including forming a chamfer on a radially outer side and a radially inner side of the first and second joint edges.

13. The method according to claim 12,
wherein the forming comprises a rolling or milling.

14. A method of forming a bearing cage segment comprising:
punching a plurality of openings in a body of sheet metal, the plurality of openings being arranged in a row,
laser cutting a first joint edge and a second joint edge spaced from the first joint edge and a first partial pocket at a first end of the row,
laser cutting a third joint edge and a fourth joint edge spaced from the third joint edge and a second partial pocket between the third joint edge and the fourth joint edge at a second end of the row, and
separating the bearing cage segment from the body of sheet metal.

15. The method according to claim 14,
wherein the separating comprises laser cutting a first longitudinal edge of the bearing cage segment extending between the first joint edge and the third joint edge and laser cutting a second longitudinal edge of the bearing cage segment extending between the second joint edge and the fourth joint edge.

16. The method according to claim 14,
wherein laser cutting a first partial pocket at the first end of the row comprises laser cutting a first side of the first partial pocket extending from the first joint edge toward the plurality of openings, laser cutting a second side of the first partial pocket from an end of the second joint edge toward the plurality of openings and laser cutting a third side of the first partial pocket connecting the first side of the partial pocket to the second side of the first partial pocket.

* * * * *